(12) United States Patent
Torimoto et al.

(10) Patent No.: US 7,649,493 B2
(45) Date of Patent: Jan. 19, 2010

(54) SYSTEM FOR TRANSMITTING A SIGNAL FOR POSITIONING AND METHOD FOR PRODUCING THE SYSTEM

(75) Inventors: Hideyuki Torimoto, Tokyo (JP); Makoto Ishii, Tokyo (JP)

(73) Assignees: Funai Electric Co., Ltd., Osaka (JP); GNSS Technologies Inc., Tokyo (JP)

( * ) Notice: Subject to any disclaimer, the term of this patent is extended or adjusted under 35 U.S.C. 154(b) by 0 days.

(21) Appl. No.: 12/368,056

(22) Filed: Feb. 9, 2009

(65) Prior Publication Data

US 2009/0189806 A1    Jul. 30, 2009

Related U.S. Application Data

(62) Division of application No. 11/065,812, filed on Feb. 25, 2005, now abandoned.

(30) Foreign Application Priority Data

Feb. 26, 2004    (JP)    .............................. 2004-052006

(51) Int. Cl.
*G01S 1/00* (2006.01)
(52) U.S. Cl. .............................. 342/357.06; 342/357.12
(58) Field of Classification Search ............ 342/357.06, 342/357.12
See application file for complete search history.

(56) References Cited

U.S. PATENT DOCUMENTS

| 7,295,826 | B1* | 11/2007 | Cook et al. | .................. 455/323 |
| 2002/0003494 | A1* | 1/2002 | Huisken | ................. 342/357.12 |
| 2002/0059651 | A1* | 5/2002 | Hirata et al. | ................. 725/153 |

* cited by examiner

*Primary Examiner*—Thomas H Tarcza
*Assistant Examiner*—Harry Liu
(74) *Attorney, Agent, or Firm*—Osha • Liang LLP

(57) ABSTRACT

A transmitting system, which is capable of transmitting a signal for positioning to an area where radio waves are hardly received, is provided. The transmitting system for transmitting the signal for positioning includes a GPS compatible mixer combining a GPS signal for positioning received by a GPS antenna and a BS broadcasting signal received by a BS antenna and outputting the combined signal, a BS-IF compatible amplifier amplifying the signal output from the GPS compatible mixer and outputting the amplified signal, a separator separating the signal output from the BS-IF compatible amplifier into a BS broadcasting signal and a GPS signal, a BS tuner receiving an input of the BS broadcasting signal output from the separator and obtaining a signal of a channel tuned by a user, a GPSBP filter passing a GPS signal included in a predetermined frequency band out of the signal output from the separator, and a GPS issuing unit.

10 Claims, 10 Drawing Sheets

SYSTEM FOR TRANSMITTING A SIGNAL FOR POSITIONING AND METHOD FOR PRODUCING THE SYSTEM

CROSS-REFERENCE TO RELATED APPLICATIONS

The present application is a divisional application of and therefore claims benefit under 35 U.S.C. §121 to U.S. patent application Ser. No. 11/065,812, filed Feb. 25, 2005. The priority application is hereby incorporated by reference in its entirety.

BACKGROUND OF INVENTION

1. Field of the Invention

The present invention relates to a system for transmitting a signal for positioning. More specifically, the present invention relates to a transmitting system capable of transmitting a broadcasting signal and a signal for positioning through a common line and to a method for producing the system.

2. Description of the Background Art

The technique for obtaining positional information based on a signal transmitted from a satellite capable for transmitting a signal for positioning is known. Wile this signal can easily be received outdoors, it cannot be received indoors or Underground. Accordingly, sometimes operations of a receiving unit for the signal may not easily be checked. It should be noted that a satellite navigation system as used herein includes not only the GPS (Global Positioning System) operated by the United States, but also Galileo of which operation is currently considered by the European Union, GLONASS (Global Navigation Satellite System) operated by the Russian Federation, and any other satellite navigation systems.

For example, Japanese Patent Laying-Open No. 8-220173 discloses a pseudo GPS signal generator, which allows checking of the operation of a GPS receiving unit indoors. The generator includes a frequency converter converting a local signal sent out from a test-target GPS receiving unit to a carrier wave of an intermediate frequency range, a digital signal generator sending out a C/A (Coarse and Access) code and a navigation message, a mixer mixing the C/A code and the navigation message into the carrier wave, a noise generator sending out a white noise of a higher level than an output signal sent out from the mixer, an adder adding the white noise to the output signal from the mixer to send out a pseudo GPS signal, and an amplifier amplifying the pseudo GPS signal to a prescribed level and supplying the amplified signal to a digital signal processor accommodated in the test-target GPS receiving unit.

According to the pseudo GPS signal generator disclosed by Japanese Patent Laying-Open No. 8-220173, the digital signal processor accommodated in the test-target GPS receiving unit is supplied with the pseudo GPS signal amplified to a prescribed level by the amplifier. The pseudo GPS signal includes the carrier wave, the C/A code, the navigation message, and the white noise. The digital signal processor extracts the navigation message from the pseudo GPS signal and checks the correlation of the C/A code. Thus, the operation of a GPS receiving unit assembled indoors can be checked without installing an antenna.

While the pseudo GPS signal generator disclosed by Japanese Patent Laying-Open No. 8-220173 generates a signal for a specific purpose, i.e., for checking the operation of a newly assembled GPS receiving unit, it does not receive an actual GPS signal and transmits it indoors. Accordingly, in order to use the GPS receiving unit indoors, the GPS signal received by an antenna must be transmitted indoors and then issued indoors.

In this case, if a new system from the GPS reception antenna to a GPS signal issuing unit is constructed, installation of cables for transmitting a signal and the like are necessary. Therefore, there has been a problem that the system cannot easily be constructed indoors when costs or installability of the cables is limited.

The present invention has been made to solve the aforementioned problem, and an object thereof is to provide a system capable of issuing a signal for positioning to a receiving unit capable of receiving a signal for positioning in an area where radio waves cannot be received directly.

Another object of the present invention is to provide a system capable of issuing a signal for positioning to a receiving unit capable of receiving a signal for positioning in an area where radio waves cannot be received directly, while suppressing an increase in costs.

Still another object of the present invention is to provide a method for producing a system capable of issuing a signal for positioning to a receiving unit capable of receiving a signal for positioning in an area where radio waves cannot be received directly.

A further object of the present invention is to provide a method for producing a system capable of issuing a signal for positioning to a receiving unit capable of receiving a signal for positioning in an area where radio waves cannot be received directly, while suppressing an increase in costs.

SUMMARY OF THE INVENTION

In order to solve the aforementioned problem, according to an aspect of the present invention, a system for transmitting s signal for positioning includes: a receiving unit receiving a positioning signal for positioning; an inputting unit accepting an input of a broadcasting signal; a mixing unit combining the positioning signal and the broadcasting signal and outputting the combined transmission signal; a separating unit separating the signal output from the Dog unit into the positioning signal and the broadcasting signal and outputting each signal; a line arranged between the mixing unit and the separating unit for transmitting the signal output from the mixing unit to the separating unit; an issuing unit issuing the separated positioning signal; and a line arranged between the separating unit and the issuing unit for transmitting the separated positioning signal from the separating unit to the issuing unit.

Preferably, the inputting unit includes a signal inputting unit connected to a cable transmitting the broadcasting signal for receiving an input of the broadcasting signal from the cable.

Preferably, the inputting unit includes a broadcasting reception antenna receiving the broadcasting signal.

Preferably, the broadcasting signal includes a satellite broadcasting signal. The broadcasting reception antenna includes a satellite broadcasting reception antenna receiving the satellite broadcasting signal.

Preferably, the mining unit includes a low-pass filter passing a frequency signal of at most a predetermined frequency, a band-pass filter passing a frequency signal included in a predetermined frequency band, and a generating unit combining the signal output from the low-pass filter and the signal output from the band-pass filter and generating the transmission signal.

Preferably, the mixing unit further includes a first impedance matching unit electrically connected to an input side of the low-pass filter, a first bias T electrically connected to an input side of the first impedance matching unit, a second bias T electrically connected to an input side of the band-pass filter, a second impedance matching unit electrically connected to an output side of the generating unit, and a third bias T electrically connected to an output side of the second impedance matching unit.

Preferably, the issuing unit further includes a filter passing a frequency signal included in the frequency band.

A method according to another aspect of the present invention is a method for producing a transmitting system for transmitting a signal for positioning. The transmitting system includes a mixing unit combining a positioning signal for positioning received by an antenna and a broadcasting signal input and outputting the combined transmission signal to a line, a separating unit separating the transmission signal into the positioning signal and the broadcasting signal and outputting each signal, and an issuing unit issuing the separated positioning signal. The method for producing the system includes: a broadcasting line connecting step of connecting a broadcasting signal inputting unit accepting an input of the broadcasting signal in the mixing unit and an output side for the broadcasting signal of the communication line; a shared line connecting step of connecting an output side of the mixing unit to the line; a line connecting step of connecting a positioning signal inputting unit accepting an input of the positioning signal in the mixing unit and an output side of the antenna; and an issuing unit connecting step of connecting an input side of the issuing unit to an output side of the separating unit.

Preferably, the broadcasting line connecting step includes a step of connecting an output side for the broadcasting signal of a cable transmitting the broadcasting signal and the broadcasting signal inputting unit.

Preferably, the broadcasting line connecting step includes a step of connecting an output side of a reception antenna receiving the broadcasting signal and the broadcasting signal inputting unit.

Preferably, the broadcasting signal includes a satellite broadcasting signal. The broadcasting reception antenna includes a satellite broadcasting reception antenna receiving the satellite broadcasting signal. The broadcasting line connecting step includes a step of connecting the broadcasting signal inputting unit and an output side of the satellite broadcasting reception antenna.

Preferably, the mixing unit includes a low-pass filter passing a frequency signal of at most a predetermined frequency, a band-pass filter passing a frequency signal included in a predetermined frequency band, and a generating unit combining the signal output from the low-pass filter and the signal output from the band-pass filter and generating the transmission signal. The line connecting step of connecting a positioning signal inputting unit includes a band-pass filter connecting step of electrically connecting an output side of the antenna and an input side of the band-pass filter. The broadcasting line connecting step includes a low-pass filter connecting step of electrically connecting an output side of the broadcasting reception antenna and an input side of the low-pass filter The shared line connecting step includes a step of connecting an output side of the generating unit to the line.

Preferably, the mixing unit further includes a first impedance matching unit electrically connected to an input side of the low-pass filter, a first bias T electrically connected to an input side of the first impedance matching unit, a second bias T electrically connected to an input side of the band-pass filter, a second impedance matching unit electrically connected to an output side of the generating unit, and a third bias T electrically connected to an output side of the second impedance matching unit. The low-pass filter connecting step includes a step of electrically connecting an output side of the broadcasting reception antenna and an input side of the first bias T. The band-pass filter connecting step includes a step of electrically connecting an output side of the GPS antenna and an input side of the second bias T. The shared line connecting step includes a step of connecting an output side of the third bias T to the line.

Preferably, the issuing unit further includes a filter passing a frequency signal included in the frequency band. The issuing unit connecting step includes a step of connecting an input side of the filter to an output side of the separating unit.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
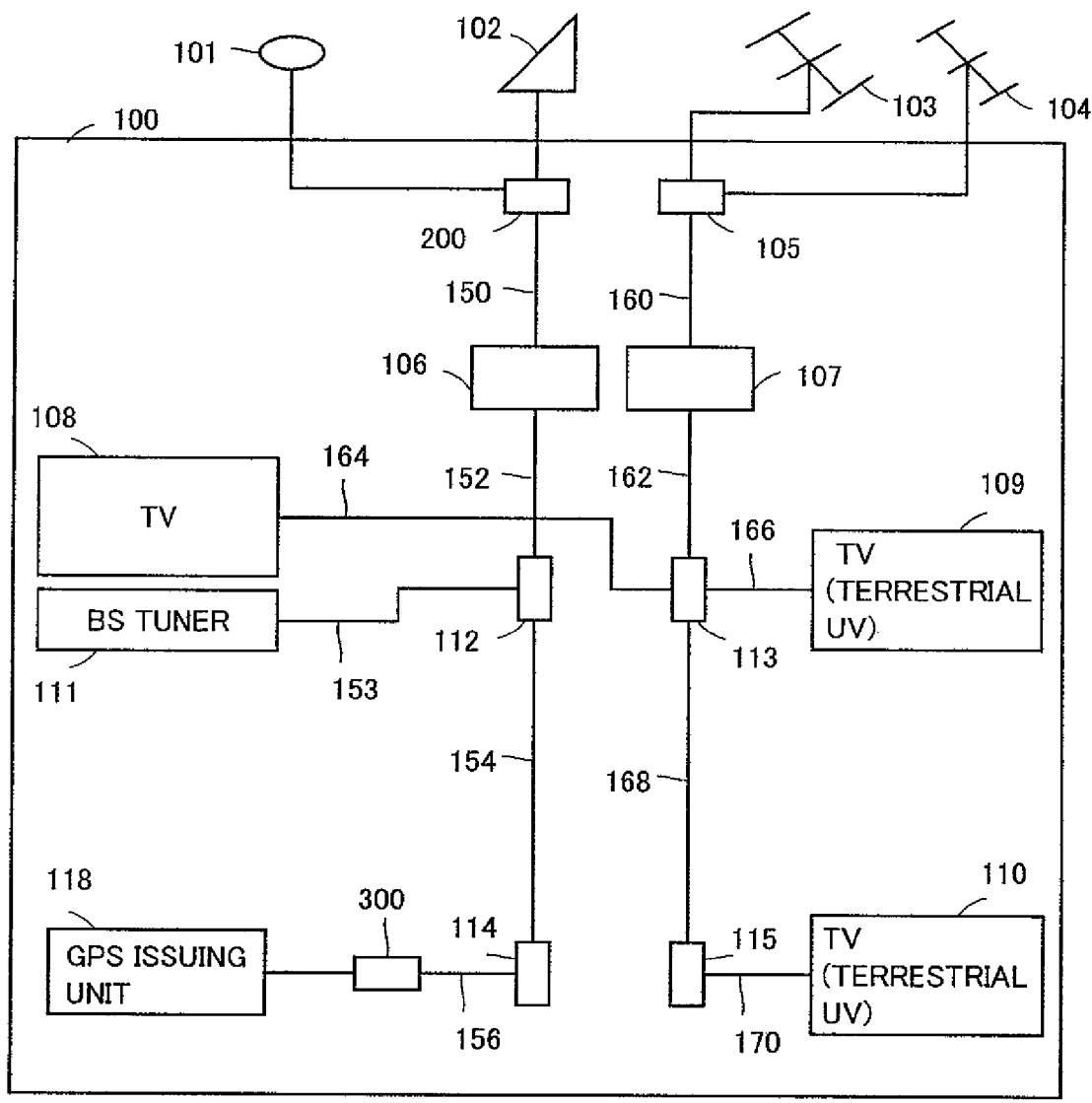
FIG. 1 shows a configuration of a transmitting system for transmitting a signal for positioning according to a first embodiment of the present invention.

In the following, referring to the drawings, embodiments of the present invention will be described. In the following description, an identical reference character is allotted to the identical components. Their names and functions are also the same. Therefore, detailed description thereof is not repeated.

First Embodiment

Referring to FIG. 1, a system constructed by a method for producing a transmitting system according to the present invention is described. As shown in FIG. 1, a transmitting system 100 includes a GPS compatible mixer 200 connected to a GPS antenna 101 and a BS antenna 102 for combining a GPS signal received by GPS antenna 101 and a BS broadcasting signal received by BS antenna 102 and outputting the combined signal, a BS-IF (Intermediate Frequency) compatible amplifier 106 connected to GPS compatible mixer 200 through a cable 150 for amplifying the signal output from GPS compatible mixer 200 and outputting the amplified signal, a separator 112 connected to BS-IF compatible amplifier 106 through a cable 152 for separating the signal output from BS-IF compatible amplifier 106 into a BS broadcasting signal and a GPS signal, a BS tuner 111 connected to separator 112 through a cable 153 for receiving an input of the BS broadcasting signal output from separator 112 and obtaining a signal of a channel tuned by a user, a terminal 114 connected to separator 112 through cable 154 for receiving an input of the GPS signal from separator 112, a GPSBP (GPS Band-Pass) filter 300 connected to terminal 114 through a cable 156 for passing a signal included in a predetermined frequency band out of the GPS signals output from terminal 114, and a GPS issuing unit 118 connected to GPSBP filter 300 for issuing the signal output from GPSBP filter 300. The signal issued from GPSBP filter 300 can be received by a GPS receiving unit.

It should be noted that a GPS signal broadcasted by so-called GPS satellites is explained as an illustrative signal for positioning in the following embodiments. This invention, however, is also applicable to other signals broadcasted by other satellite navigation systems such as Galileo, GLO-NASS or the like.

Transmitting system 100 further includes an UV compatible mixer 105 connected to a VHF (Very High Frequency) antenna 103 and an UHF (Ultra High Frequency) antenna 104 for combining a VHF signal received by VHF antenna 103 and an UHF signal received by UHF antenna 104 and outputting the combined signal, a VHF/UHF compatible amplifier 107 connected to UV compatible mixer 105 through a cable 160 for amplifying the signal output from UV compatible mixer 105, a distributor 113 connected to VHF/UHF compatible amplifier 107 through a cable 162 for distributing the signal output from VHF/UHF compatible amplifier 107, a television set 108 connected to distributor 113 through a cable 164 for receiving a television broadcasting signal from distributor 113, a television set 109 connected to distributor 113 through a cable 166 for receiving a television broadcasting signal from distributor 113, a terminal 115 connected to distributor 113 through a cable 168 for receiving a television broadcasting signal from distributor 113, and a television set 110 connected to terminal 115 through a cable 170 for receiving an input of the signal from terminal 115 to receive television broadcasting.

It should be noted that the number of television sets in the transmitting system according to the present embodiment is not limited to three as shown in FIG. 1. Further, it is only necessary for transmitting system 100 to include at least BS antenna 102 or any other antenna for receiving a satellite broadcasting signal, and a cable installed to allow the received signal to be transmitted indoors. Still further, while reception of a VHF signal and a UHF signal, i.e., terrestrial television signals, has been referred to, transmitting system 100 is not limited thereto. For example, it may be a system that can receive CATV (Cable Television).

Referring back to FIG. 1, a radio wave received by GPS antenna 101 and a radio wave received by BS antenna 102 are input to GPS compatible mixer 200. The signal output from GPS compatible mixer 200 is input to BS-IF compatible amplifier 106. The signal output from BS-IF compatible amplifier 106 is input to separator 112. The signals output from separator 112 are input to BS tuner 111 and terminal 114. The signal output from terminal 114 is input to GPSBP filter 300. The signal passed through GPSBP filter 300 is issued by GPS issuing unit 118.

A radio wave received by VHF antenna 103 and a radio wave received by UHF antenna 104 are input to UV compatible mixer 105. The signal output from UV compatible mixer 105 is input to VHF/UHF compatible amplifier 107. The signal output from VHF/UHF compatible amplifier 107 is input to distributor 113. The signal output from distributor 113 is input to television set 108, television set 109 and terminal 115. The signal output from terminal 115 is input to television set 110.

Figure 2:
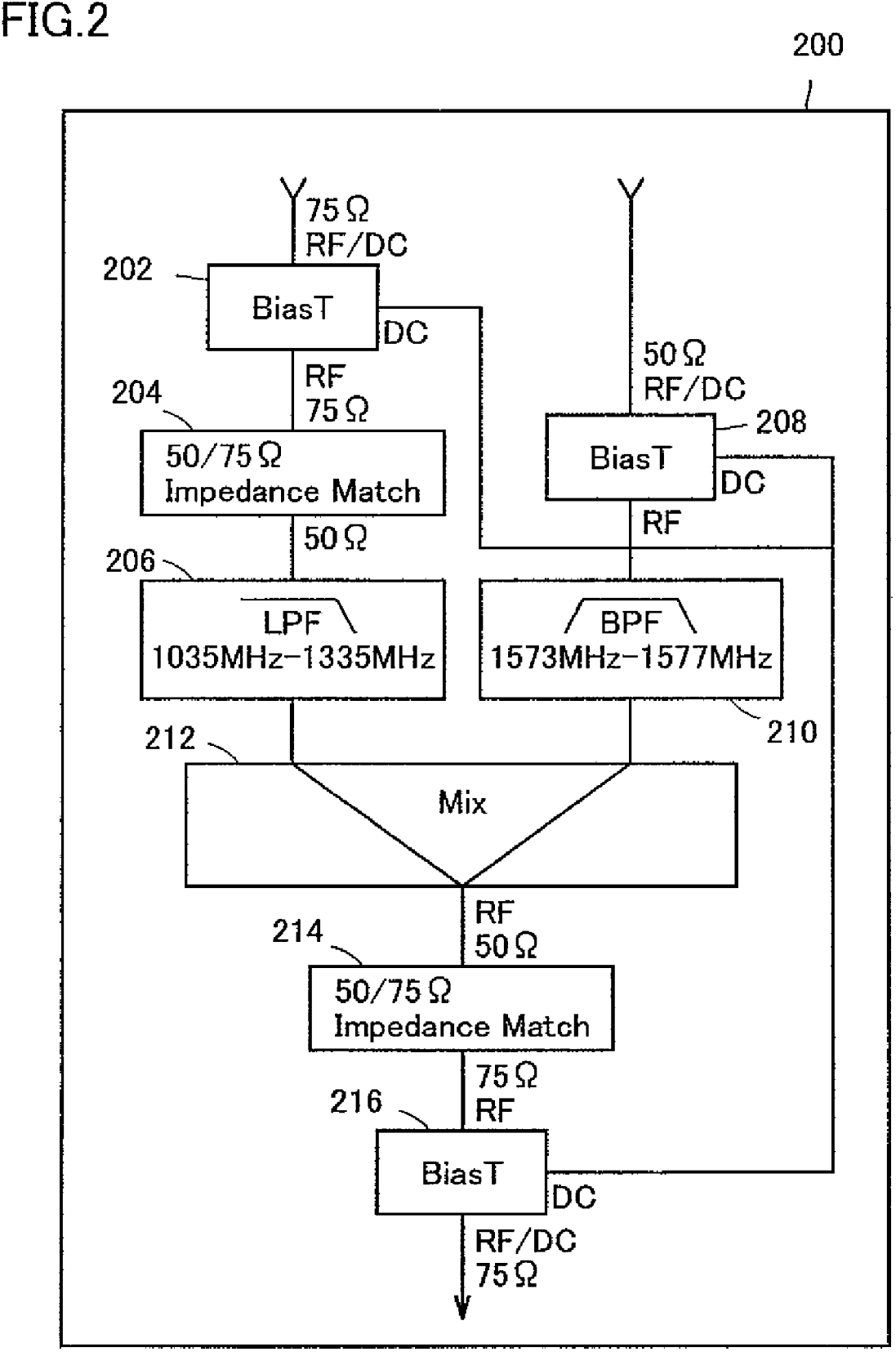
FIG. 2 is a block diagram showing a configuration of a mixer used in the transmitting system of FIG. 1.

Referring to FIG. 2, a configuration of GPS compatible mixer 200 in transmitting system 100 according to the present embodiment is described. FIG. 2 is a block diagram showing a hardware configuration of GPS compatible mixer 200.

As shown in FIG. 2, GPS compatible mixer 200 includes a bias T 202 connected to BS antenna 102 through a cable (not shown), an impedance matching unit 204 connected to bias T 202 for matching the impedance of an input signal to a predetermined output impedance, a low-pass filter 206 connected to impedance matching unit 204 for passing signals of at most a predetermined frequency, a bias T 208 connected to GPS antenna 101 through a cable (not shown) for applying a voltage to the signal output from GPS antenna 101, a band-pass filter 210 connected to bias T 208 for passing signals of a predetermined frequency band, a mixer 212 connected to low-pass filter 206 and band-pass filter 210 for combining signals output from respective filters, an impedance matching unit 214 connected to mixer 212 for matching the impedance of an input signal to a predetermined output impedance, and a bias T 216 connected to impedance matching unit 214 for applying a voltage to the signal output from impedance matching unit 214. The signal output from bias T 216 is input to BS-IF compatible amplifier 106, which will be described later.

Figure 3:
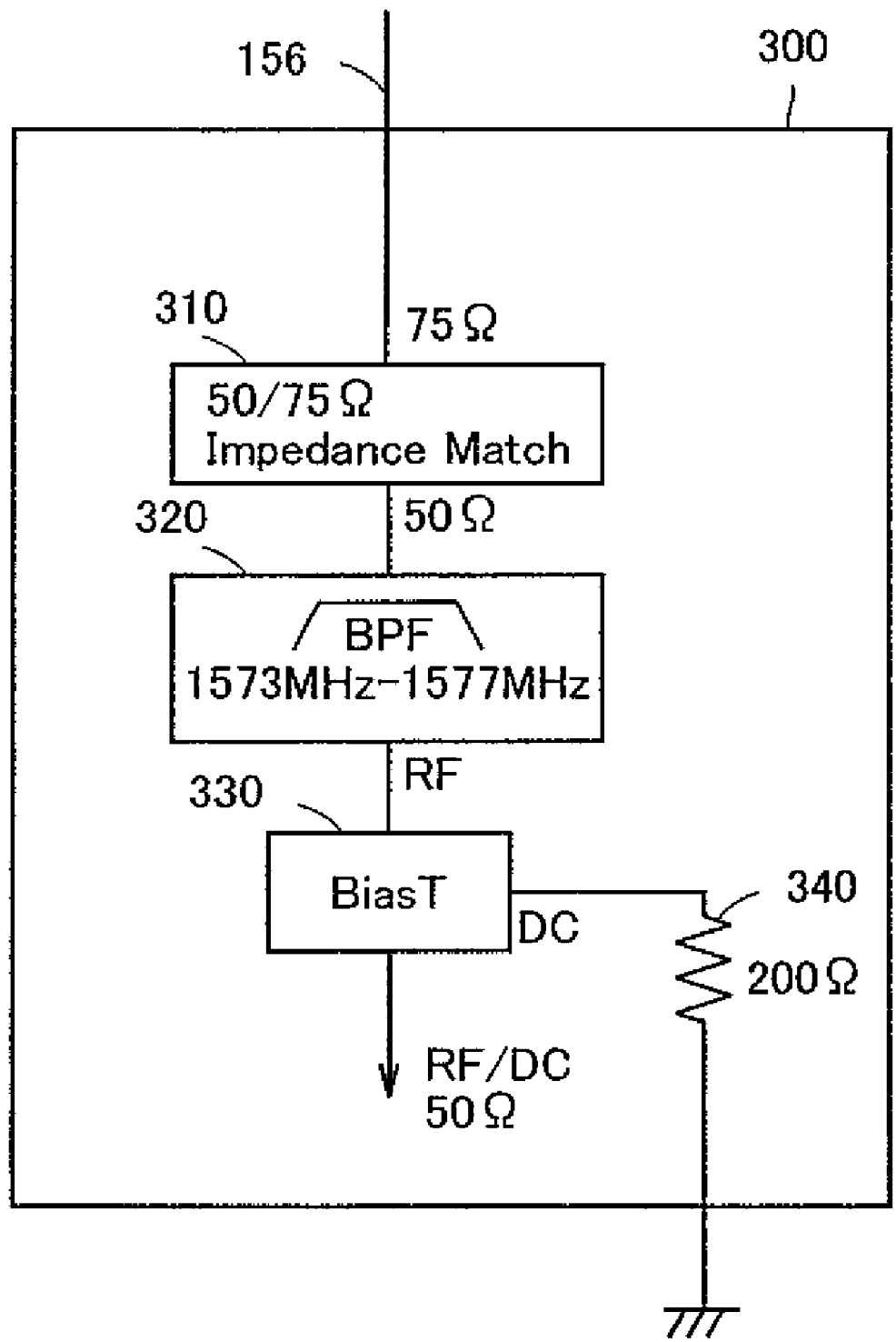
FIG. 3 is a block diagram showing a configuration of a filter used in the transmitting system of FIG. 1.

Referring to FIG. 3, a configuration of GPSBP filter 300 in transmitting system 100 according to the present embodiment is described. FIG. 3 is a block diagram showing a hardware configuration of GPSBP filter 300.

As shown in FIG. 3, GPSBP filter 300 includes an impedance matching unit 310 connected to terminal 114 through cable 156 for matching the impedance of an input signal to a predetermined impedance, a band-pass filter 320 connected to impedance matching unit 310 for passing signals of a predetermined frequency band out of the signals output from impedance matching unit 310, a bias T 330 connected to band-pass filter 320 for applying a voltage to the signal output from band-pass filter 320, and a resistor 340 connected to bias T 330.

Impedance matching unit 310 converts the impedance of an input signal (for example, 75 Ω) to an impedance that is predetermined for the output signal (for example, 50 Ω), and outputs the converted signal. Band-pass filter 320 passes signals of, for example, 1573 MHz to 1577 MHz. The signal output from GPSBP filter 300 is input to a GPS signal issuing unit (not shown). When GPS signal issuing unit issues the GPS signal, a GPS receiving unit (not shown) receives the signal, whereby it can obtain positional information.

Figure 4:
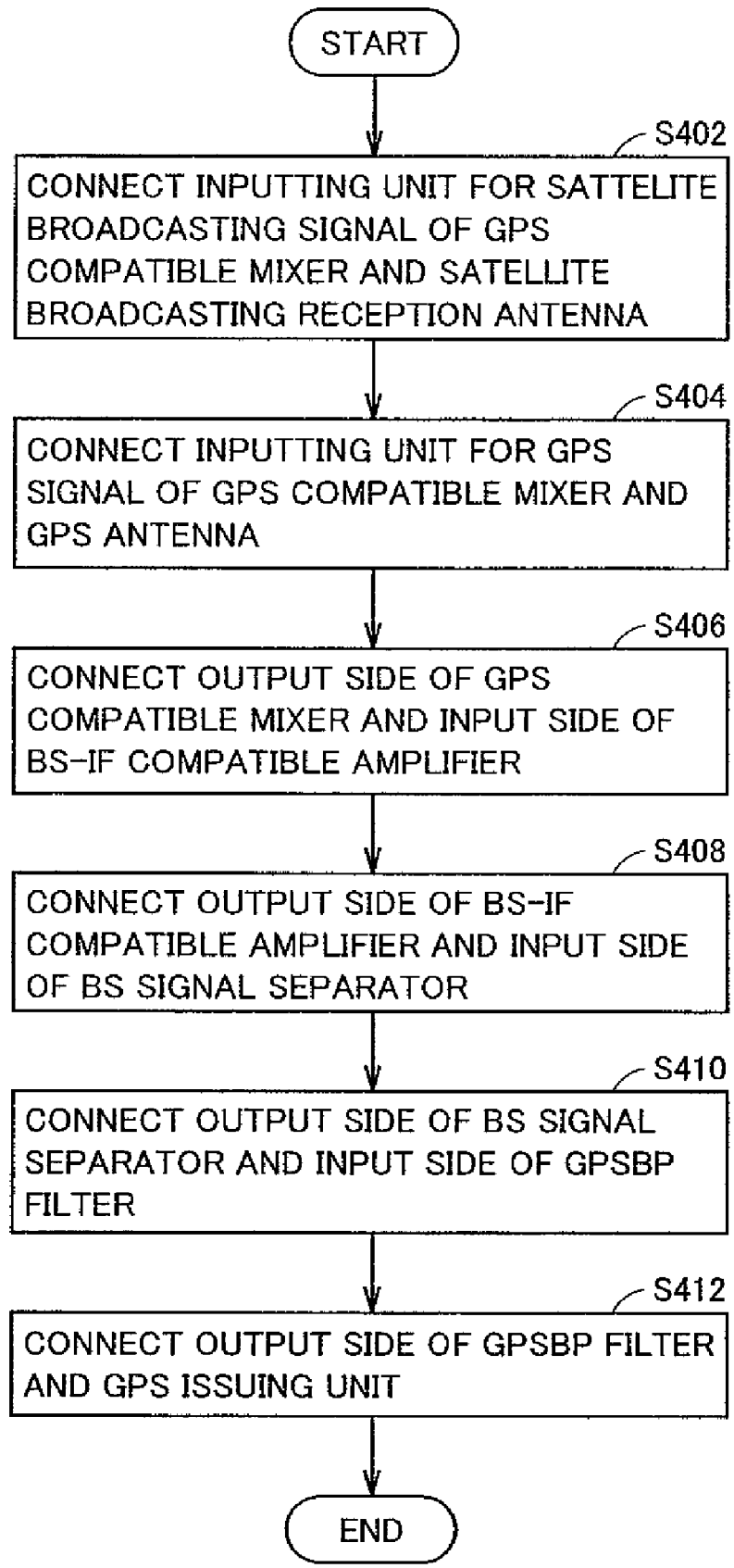
FIG. 4 is a flowchart showing a procedure of a method for producing the transmitting system shown in FIG. 1.

Referring to FIG. 4, a procedure for installing the transmitting system according to the present embodiment is described.

At step S402, an inputting unit for a satellite broadcasting signal of GPS compatible mixer 200 and the satellite broadcasting reception antenna are connected through a cable.

At step S404, an inputting unit for a GPS signal of GPS compatible mixer 200 and a terminal of the GPS antenna are connected through a cable.

At step S406, the output side (e.g., an output port) of GPS compatible mixer 200 and the input side (e.g., an input port) of BS-IF compatible amplifier 106 are connected through cable 150.

At step S408, the output side of BS-IF compatible amplifier 106 and the input side of BS signal separator 112 are connected through cable 152.

At step S410, the output side of BS signal separator 112 and the input side of GPSBP filter 300 are connected through cable 154.

At step S412, the output side of GPSBP filter 300 and the input side of GPS issuing unit 118 are connected.

It should be noted that each step above is independent of others, and therefore the step sequencing for execution may be different. Specifically, transmitting system 100 according to the present embodiment includes GPS compatible mixer 200 and GPSBP filter 300, in addition to the configuration of a satellite broadcasting reception system capable of receiving satellite broadcasting. Accordingly, when a satellite broadcasting reception system already exists, such a step sequencing is sufficient that realizes addition of GPS compatible mixer 200 and GPSBP filter 300 to the satellite broadcasting reception system.

As described above, GPS signal transmitting system 100 according to the present embodiment includes GPS compatible mixer 200 and GPSBP filter 300 in addition to a system capable of receiving BS broadcasting. In this case, a GPS signal received by GPS antenna 101 is combined with a BS broadcasting signal and transmitted through cables 150, 152, 154, and 156 of the system capable of receiving BS broadcasting. Accordingly, even at an indoor or underground location where a GPS signal cannot be received directly, a GPS signal can be obtained using an existing BS signal reception apparatus. Thus, by causing GPS issuing unit 118 to issue the obtained GPS signal, a user can receive the GPS signal by a GPS receiving unit even at a location where a GPS signal cannot otherwise be received.

Second Embodiment

In the following, a second embodiment of the present invention is described. A GPS compatible mixer 500 in a transmitting system according to the present embodiment is different from GPS compatible mixer 200 shown in FIG. 2 in that it has a frequency conversion function.

Specifically, in a GPS signal transmitting system, if a guardband between the frequency band of a satellite broadcasting signal and the frequency of a GPS signal is not sufficient, each signal may interfere in a transmission cable. Accordingly, the frequency of a GPS signal can be converted to a high frequency to broaden the guardband. This can prevent interference between the satellite broadcasting signals and the GPS signal in the transmission cable.

Figure 5:
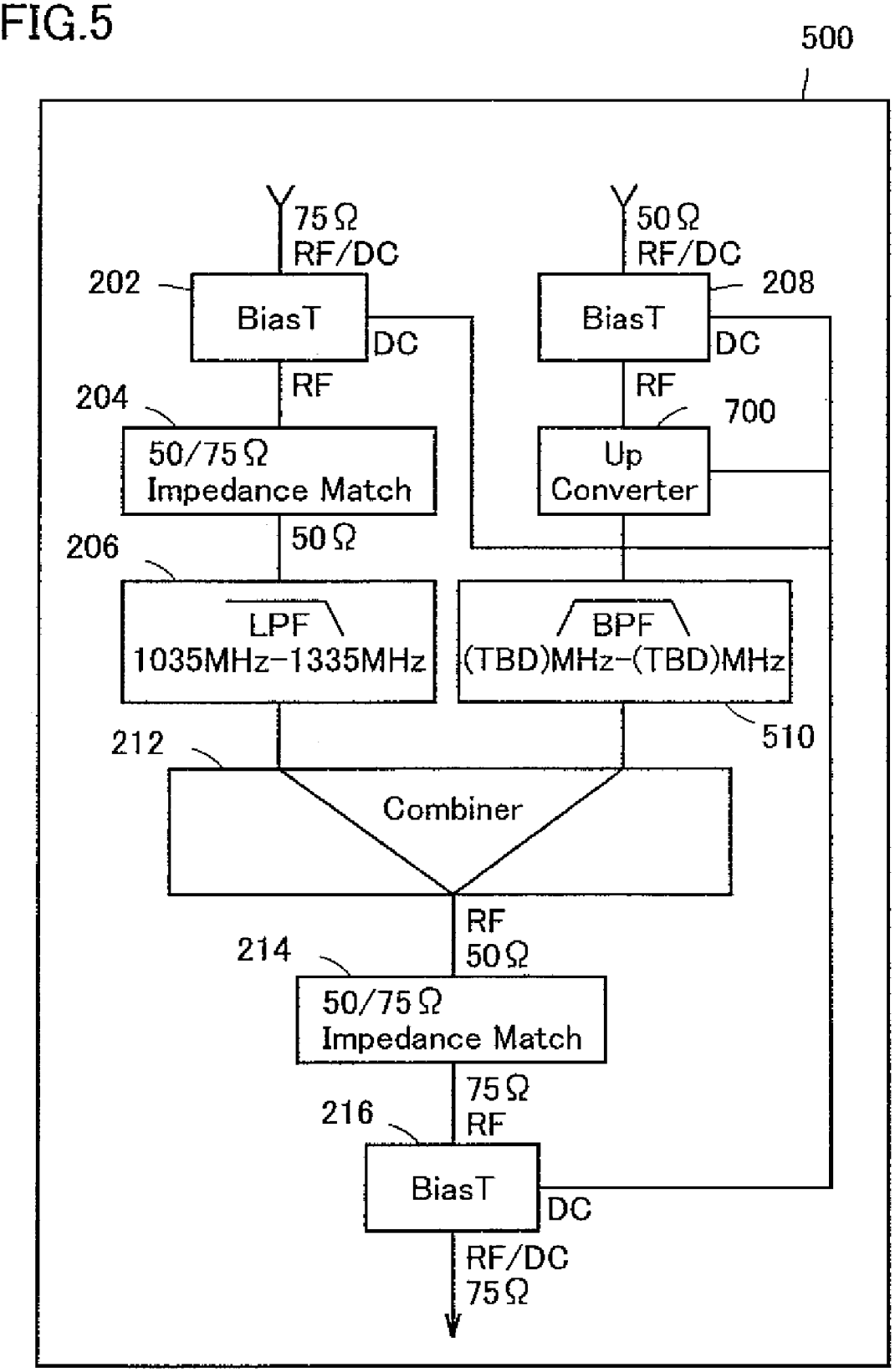
FIG. 5 is a block diagram showing a configuration of a mixer used in a transmitting system for transmitting a signal for positioning according to a second embodiment of the present invention.

Referring to FIG. 5, a configuration of GPS compatible mixer 500 according to the present embodiment is described. FIG. 5 is a block diagram showing a hardware configuration of GPS compatible mixer 500. The identical reference character is allotted to components identical to those in the first embodiment. Their functions and effects are also the same. Therefore, detailed description thereof is not repeated.

As shown in FIG. 5, GPS compatible mixer 500 farther includes an up-converter 700 connected to bias T 208 for converting the frequency of a signal from bias T 208 to a high frequency, in addition to the configuration of GPS compatible mixer 200. The output side of up-converter 700 is connected to the input side of band-pass filter 510.

A GPS signal input to GPS compatible mixer 500 is converted to a high frequency by up-converter 700 and input to mixer 212. Mixer 212 combines the GPS signal and a BS broadcasting signal and outputs the combined signal. In this case, as the frequency of the GPS signal has been converted to the high frequency, the signal output from mixer 212 has a sufficient guardband. Accordingly, at the following transmission also, interference of the GPS signal and the BS broadcasting signal can be prevented.

Figure 6:
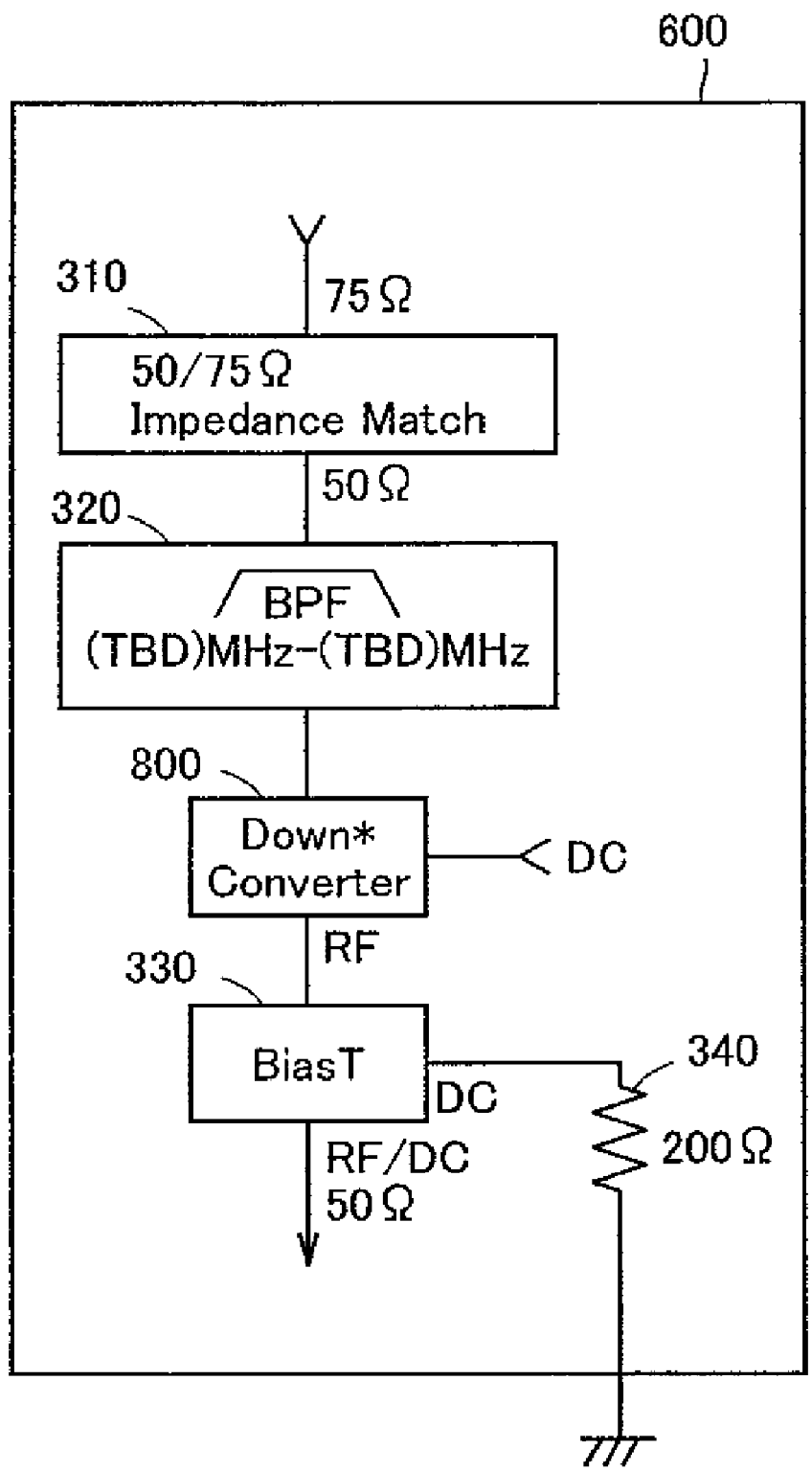
FIG. 6 is a block diagram showing a configuration of a filter used in the transmitting system according to the second embodiment of the present invention.

Referring to FIG. 6, a configuration of a GPSBP filter 600 according to the present embodiment is described. FIG. 6 is a block diagram showing a hardware configuration of GPSBP filter 600.

As shown in FIG. 6, GPSBP filter 600 farther includes a down-converter 800 connected to band-pass filter 320 for converting the frequency of a signal output from band-pass filter 320 to a predetermined low-frequency, in addition to the configuration of GPSBP filter 300 shown in FIG. 3. A signal output from terminal 114 is input to impedance matching unit 310. The signal output from impedance matching unit 310 is input to band-pass filter 320. The signal output from band-pass filter 320 is input to down-converter 800. Down-converter 800 converts the frequency of the input signal to a low-frequency and outputs the converted signal. The signal output from down-converter 800 is input to bias T 330. The signal output from bias T 330 is input to GPS issuing unit 118. with GPSBP filter 600 having the configuration described above, a GPS signal converted to a high frequency can be converted again to the original frequency. Thus, even when the interval between the frequency of a GPS signal and the frequency band of a satellite broadcasting signal is not sufficient, the frequency of the GPS signal can temporarily be converted to a high frequency and transmitted, while interference between the satellite broadcasting signal is prevented. The signal can be converted to a low frequency, and a GPS signal having a prescribed frequency can be obtained.

Figure 7:
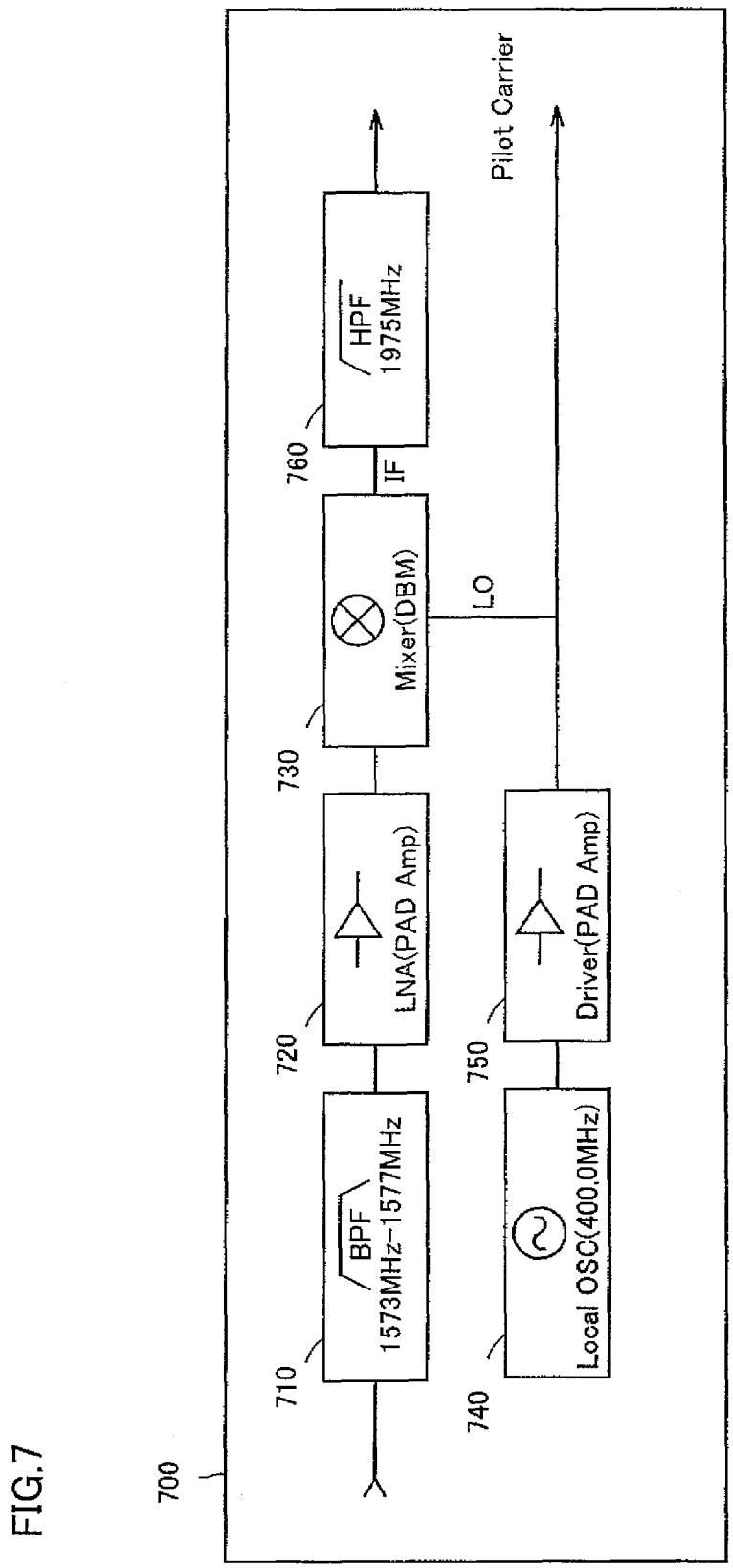
FIG. 7 is a block diagram showing a configuration of an up-converter used in the transmitting system according to the second embodiment of the present invention.

Referring to FIG. 7, up-converter 700 included in GPS compatible mixer 500 is described. FIG. 7 is a block diagram showing a hardware configuration of up-converter 700.

Up-converter 700 includes a band-pass filter 710 connected to bias T 208 for passing a frequency included in a predetermined frequency band out of the signals output from bias T 208, a low-noise amplifier 720 connected to band-pass filter 710 for amplifying the signal output from band-pass filter 710, an oscillator 740 for amplifying a predetermined frequency signal, a driver amplifier 750 connected to oscillator 740 for amplifying the signal output from oscillator 740, a mixer 730 connected to low-noise amplifier 720 and driver amplifier 750 for combining signals respectively output therefrom, a high-pass filter 760 connected to mixer 730 for passing signals of at least a predetermined frequency out of the signals output from mixer 730. The signal output from high-pass filter is input to mixer 212.

Figure 8:
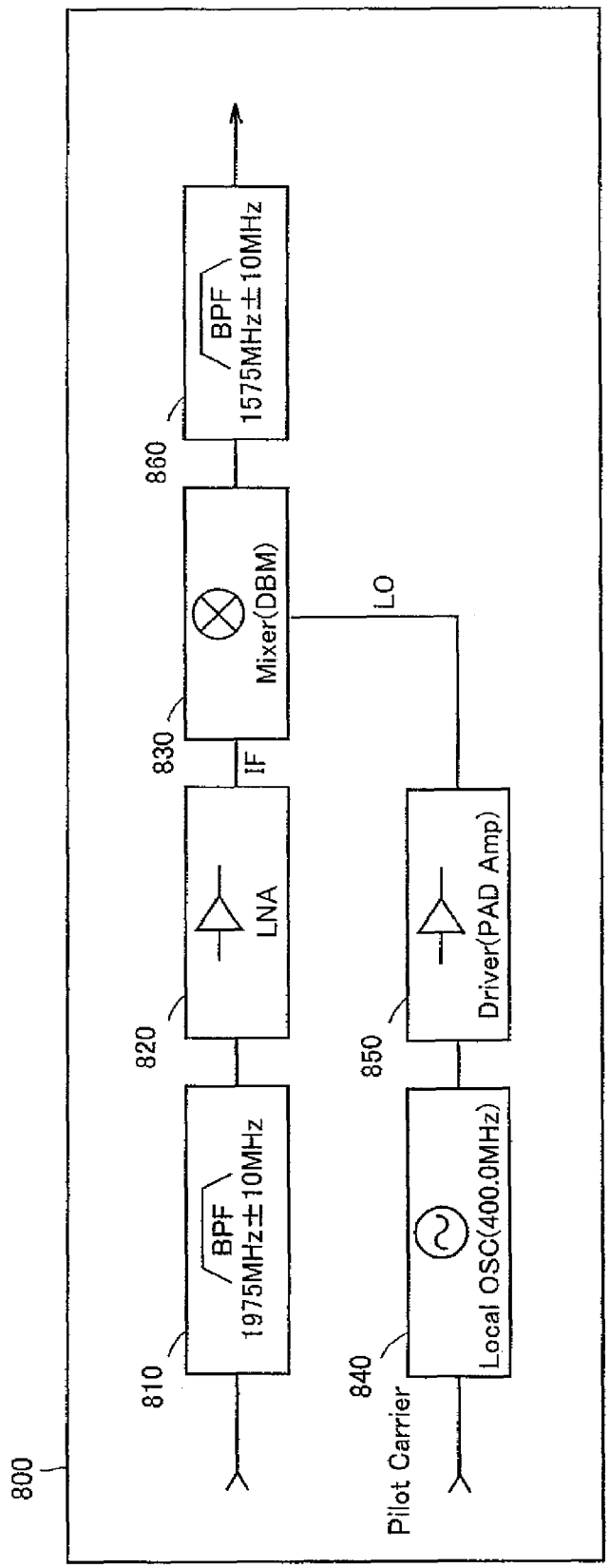
FIG. 8 is a block diagram showing a configuration of a down-converter used in the transmitting system according to the second embodiment of the present invention.

Referring to FIG. 8, a configuration of down-converter 800 included in GPSBP filter 600 is described. FIG. 8 is a block diagram showing a hardware configuration of down-converter 800.

As shown in FIG. 8, down-converter 800 includes a band-pass filter 810 connected to band-pass filter 320 and bias T 330 shown in FIG. 6 for passing signals included in a predetermined frequency band out of the signals output from band-pass filter 320, a low-noise amplifier 820 connected to band-pass filter 810 for amplifying the signal output from band-pass filter 810, an oscillator 840 for oscillating a predetermined frequency signal, a driver amplifier 850 for amplifying the signal output from oscillator 840, a mixer 830 connected to low-noise amplifier 820 and driver amplifier 850 for combining signals respectively output from the amplifiers, a band-pass filter 860 for passing signals included in a predetermined frequency band out of the signals output from mixer 830. The signal output from band-pass filter 860 is input to bias T 330.

With down-converter 800 having the configuration described above, the frequency of a GPS signal converted to a high frequency by up-converter 700 is converted again to the initial frequency. Accordingly, a signal of the frequency that the GPS receiving unit can receive can be issued.

As described above, according to the GPS signal transmitting system having GPS compatible mixer 500 and GPSBP filter 600 of the present embodiment, when the interval between the frequency of a GPS signal and the frequency band of a satellite broadcasting signal (for example a CS broadcasting signal) is not sufficient for preventing the interference, GPS compatible mixer 500 temporarily converts the frequency of the GPS signal to a high frequency and outputs the converted signal. GPSBP filter 600 converts the signal to a low frequency again and outputs the signal as a GPS signal. Accordingly, when a GPS signal is combined for transmission in a cable transmitting a satellite broadcasting signal, the GPS signal is transmitted to GPS issuing unit 118 without inviting the interference between the satellite broadcasting signal. Thus, without degrading accuracy of a signal received by GPS antenna 101, the signal can be transmitted to GPS issuing unit 118 installed at the location where a radio wave cannot be received. By causing such a signal to be issued, a user of the GPS receiving unit can obtain precise positional information or time information.

According to the GPS signal transmitting system of the first and second embodiments of the present invention described in detail above, by providing GPS antenna 101, the GPS compatible mixer and the GPSBP filter to an existing satellite broadcasting reception apparatus, a system that can transmit a GPS signal to a location where a GPS signal cannot otherwise be received can be constructed. Thus, as it is not necessary to construct the entire reception system for receiving a GPS signal and transmitting the signal to such a location, an increase in costs as to construction of the system for receiving a GPS signal can be minimized, i.e., to the costs of the GPS compatible mixer and the GPSBP filter described above. While GPSBP filter 300 has been described in the embodiments to have the characteristics of passing signals of 1573 MHz to 1577 MHz, it may have the characteristics of passing signals included in other frequency bands. For example, if another GPS signal band currently under consideration is used for transmitting a GPS signal, a filter having characteristics of passing signals included in the frequency band may be used.

Third Embodiment

Figure 9:
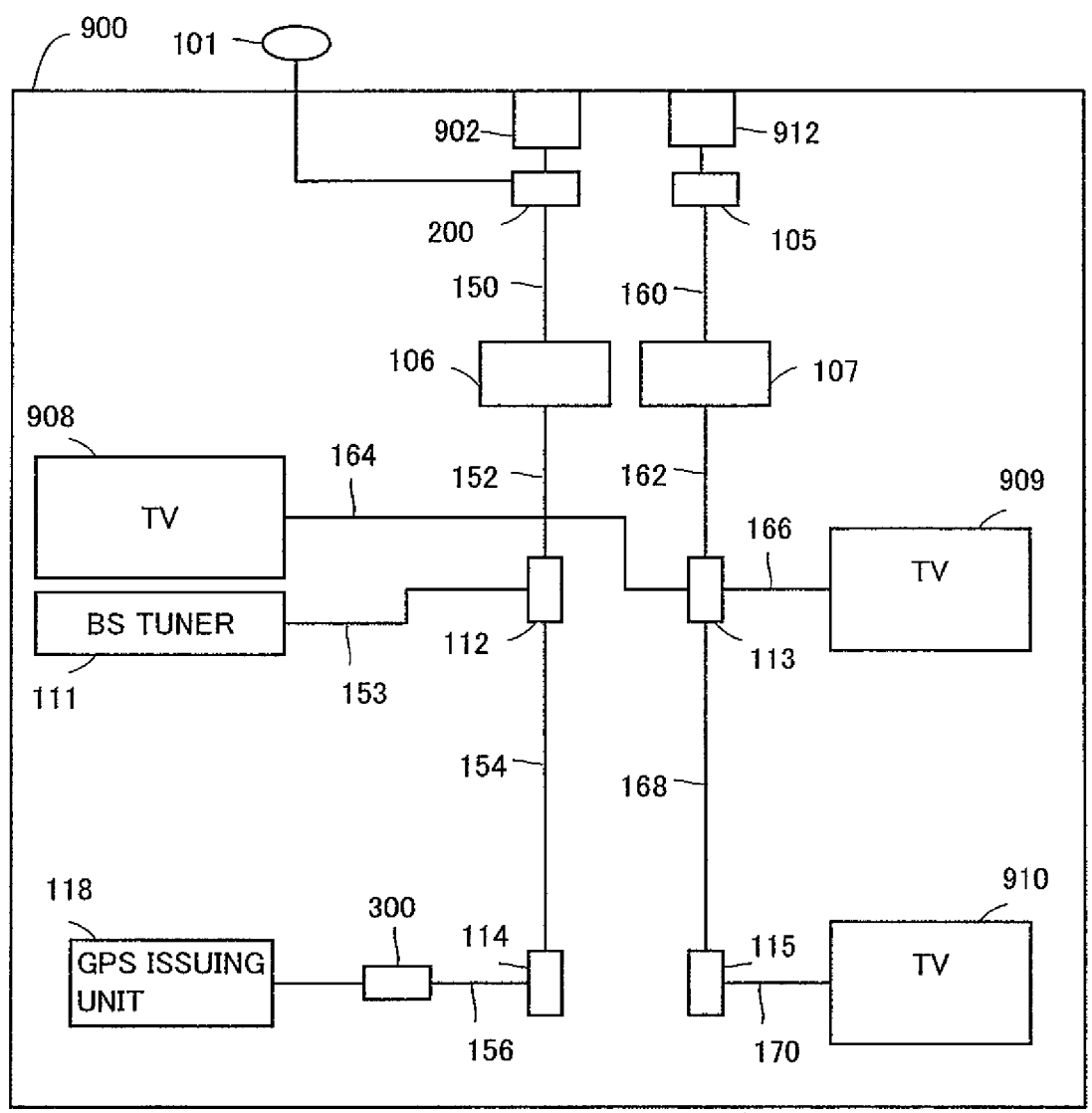
FIG. 9 is a block diagram showing a configuration of a transmitting system for transmitting a signal for positioning according to a third embodiment of the present invention.
Figure 10:
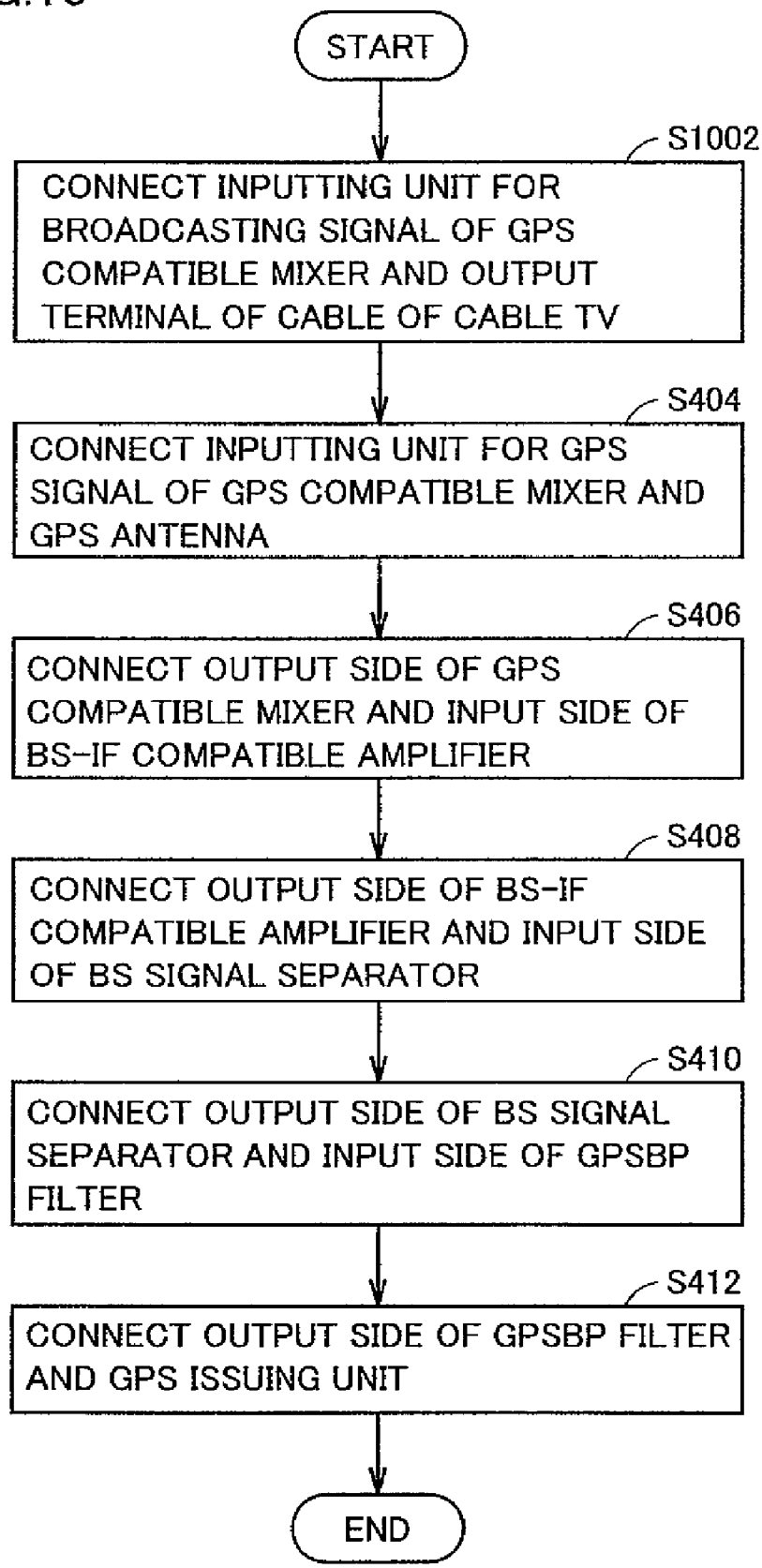
FIG. 10 is a flowchart showing a procedure of a method for producing the transmitting system shown in FIG. 9.

Referring to FIGS. 9 and 10, a third embodiment of the present invention is described. A transmitting system 900 according to the present embodiment can be implemented by using an apparatus that can receive cable broadcasting.

Referring to FIG. 9, a connection mode of a transmitting system 900 according to the present embodiment is described. FIG. 9 is a block diagram showing a hardware configuration of transmitting system 900 capable of receiving cable broadcasting.

As shown in FIG. 9, transmitting system 900 includes terminals 902 and 912. To terminals 902 and 912, cables (not shown) for receiving cable broadcasting are connected. Transmitting system 900 receives an input of a signal by cable broadcasting through terminals 902 and 912.

Television sets 908-910 connected to transmitting system 900 each have a function of displaying cable broadcasting. For example, television sets 908-910 includes a tuner (not shown) for tuning a channel selected by a user out of broadcasting signals transmitted by cable broadcasting. It should be noted that a manner of television sets 908-910 is not specifically limited.

Transmitting system 900 mixes a broadcasting signal input through terminal 902 and a GPS signal at GPS compatible mixer 200 and outputs the mixed signal. The output signal is transmitted through cable 150 and cable 156 to GPSBP filter 300, as described in the first embodiment. The signal issued from GPSBP filter 300 is sent to GPS issuing unit 118. When GPS issuing unit 118 transmits the signal, it is received by, for example a GPS receiving unit.

With the configuration shown in FIG. 9, a GPS signal is transmitted in transmitting system 900 by cables for transmitting a broadcasting signal. Therefore, even at a location where a GPS signal cannot be received directly (e.g., at an indoor or underground location), a GPS signal can be supplied if cable broadcasting can be received at that location. Accordingly, even at such a location, positional information can be obtained by an apparatus capable of receiving a GPS signal (e.g., a mobile phone, surveying instrument or the like). Alternatively, a test for checking the operation of GPS function can easily be performed.

It should be noted that while the number of terminals provided to transmitting system 900 for receiving an input of a television broadcasting signal is "two" in FIG. 9, the number is not limited thereto. For example, one terminal, or three or more terminals may be provided.

Referring to FIG. 10, a procedure for installing the transmitting system according to the present embodiment is described. In the following description, an identical step reference character is allotted to the process identical to that in the first embodiment. Their names and functions are also the same. Therefore, detailed description thereof is not repeated.

At step S1002, an inputting unit for satellite broadcasting signal of GPS compatible mixer 200 and terminal 902 are connected. To terminal 902, a cable for receiving cable broadcasting is connected.

Thus, according to the present embodiment, even at a location where a broadcasting reception antenna is hardly installed, signal transmitting system 900 for transmitting a GPS signal can be constructed, utilizing an apparatus capable of receiving cable broadcasting.

It should be noted that, while cables 150, 152, 154, and 156 have been described as those corresponding to, for example, coaxial cables, the manner of cables is not limited thereto. For example, inside signal transmitting system 100 and 900, wireless LAN (Local Area Network) or any other wireless transmissions can be employed. Thus, since limitations on installation of cables are eliminated, the degree of freedom in the configuration of signal transmitting system 100 and 900 can be improved.

Further, while use of broadcasting reception antenna and reception of a signal by cable broadcasting have been described separately as means for receiving a broadcasting signal, a combination thereof can be employed.

Although the present invention has been described and illustrated in detail, it is clearly understood that the same is by way of illustration and example only and is not to be taken by way of limitation the spirit and scope of the present invention being limited only by the terms of the appended claims.

What is claimed is:

1. A GPS signal transmitting system for transmitting a signal by combining a GPS signal received by a GPS antenna with a satellite signal received by a satellite antenna, comprising:
   a first line transmitting the GPS signal output from said GPS antenna;
   a second line transmitting the satellite signal output from said satellite antenna;
   a mixer unit connected to the first line and the second line to combine the GPS signal with the satellite signal to output a combined signal, said mixer unit including an up-converter to up-convert the frequency of the GPS signal sent out from said GPS antenna, and a generator combining the GPS signal output from the up-converter with the satellite signal sent out from said satellite antenna to generate a signal;
   a third line transmitting a signal output from the generator;
   a separator to separate the signal transmitted via the third line into the GPS signal and the satellite signal;
   a down-converter to down-convert the frequency of the GPS signal separated by said separator; and
   a transmitter to transmit the GPS signal based on the output from said down-converter.

2. The GPS signal transmitting system according to claim 1, wherein said up-converter includes:
   a first oscillator;
   a first mixer to combine a signal output from said oscillator with the GPS signal; and
   a circuit to output the signal output from said first oscillator as a pilot carrier signal, and wherein said down-converter includes:
      a second oscillator to oscillate based on the pilot carrier signal output from said up-converter, and
      a mixer to combine the GPS signal with a signal output from the second oscillator.

3. The GPS signal transmitting system according to claim 2, wherein said down-converter further includes an amplifier to amplify the signal transmitted by said third line to output the amplified signal.

4. The GPS signal transmitting system according to claim 1, wherein said mixer unit further includes:
   a low-pass filter to pass a frequency signal of the satellite signal lower than a pre-determined frequency, and
   a band-pass filter to pass a frequency signal of the GPS signal within a pre-determined frequency band.

5. The GPS signal transmitting system according to claim 4, wherein said transmitter further includes a filter to pass a frequency signal within the frequency band.

6. A method for setting up a GPS signal transmitting system for transmitting a signal by combining a GPS signal received by a GPS antenna with a satellite signal received by a satellite antenna, comprising the steps of:
   connecting said GPS antenna with a first line to enable the GPS signal output from said GPS antenna to be transmitted;
   connecting said satellite antenna with a second line to enable the satellite signal output from said satellite antenna to be transmitted;
   connecting a mixer unit to combine the GPS signal with the satellite signal to output the combined signal with said first line and said second line to enable the GPS signal and the satellite signal the be supplied to said mixer unit, said step of connecting a mixer unit including the steps of:
      connecting said GPS antenna with an up-converter to enable the frequency of the GPS signal transmitted from said GPS antenna to be up-converted, and
      connecting an output side of said up-converter and an output side of said satellite antenna with an input side of a generator to enable the GPS signal output from the up-converter and the satellite signal transmitted from said satellite antenna to be combined;
   connecting an output side of said generator with a third line to enable the combined signal composed of the GPS signal and the satellite signal to be transmitted;
   connecting said third line with an input side of a separator to enable the combined signal to be separated into the GPS signal and the satellite signal;
   connecting an output side of the separator with an input side of a down-converter to enable the frequency of the separated GPS signal to be down-converted; and
   connecting an output side of said down-converter with an input side of a transmitter to enable the GPS signal to be transmitted.

7. The method according to claim 6, wherein said up-converter includes:
   a first oscillator;
   a first mixer to combine a signal output from said oscillator with the GPS signal; and
   a circuit to output the signal output from said first oscillator as a pilot carrier signal, and wherein said down-converter includes:
      a second oscillator to oscillate based on the pilot carrier signal output from said up-converter, and
      a mixer to combine the GPS signal with a signal output from the second oscillator.

8. The method according to claim 7, wherein said down-converter further includes an amplifier to amplify the signal transmitted by said third line to output the amplified signal.

9. The method according to claim 6, wherein said mixer unit further includes:
   a low-pass filter to pass a frequency signal of the satellite signal lower than a pre-determined frequency, and
   a band-pass filter to pass a frequency signal of the GPS signal within a pre-determined frequency band.

10. A method for transmitting a GPS signal indoors, comprising the steps of:
    transmitting a GPS signal received by a GPS antenna and a satellite signal received by a satellite antenna to a mixer unit to combine the GPS signal with the satellite signal in order to generate a combined signal, said step including the steps of:
       up-converting the frequency of the GPS signal transmitted from said GPS antenna, and
       combining the up-converted signal with the satellite signal transmitted from said satellite antenna;
    separating the transmitted signal output from the mixer unit;
    down-converting the frequency of the separated GPS signal; and
    transmitting the down-converted GPS signal;
    wherein said step of up-converting includes the steps of:
       outputting a reference frequency signal,
       combining the reference frequency signal with the GPS signal, and
       outputting the reference frequency signal as a pilot carrier signal; and
    wherein said step of down-converting includes the steps of:
       outputting a signal based on the pilot carrier signal, and
       combining the separated GPS signal with the signal output from said step of outputting a signal based on the pilot carrier signal.

* * * * *